US012632203B2

(12) United States Patent (10) Patent No.: US 12,632,203 B2

Chen (45) Date of Patent: May 19, 2026

(54) SCREEN DISPLAY METHOD, STORAGE MEDIUM, AND ELECTRONIC DEVICE FOR REDUCING POWER CONSUMPTION OF THE AOD MODE

(71) Applicant: GUANGDONG OPPO MOBILE TELECOMMUNICATIONS CORP., LTD., Dongguan (CN)

(72) Inventor: Long Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/870,340

(22) PCT Filed: Aug. 31, 2022

(86) PCT No.: PCT/CN2022/116116

§ 371 (c)(1),
(2) Date: Nov. 27, 2024

(87) PCT Pub. No.: WO2023/071506

PCT Pub. Date: May 4, 2023

(65) Prior Publication Data

US 2026/0119102 A1 Apr. 30, 2026

(30) Foreign Application Priority Data

Oct. 29, 2021 (CN) .......................... 202111280623.5

(51) Int. Cl.
*G06F 3/14* (2006.01)
*G09G 3/20* (2006.01)

(52) U.S. Cl.
CPC ................. *G06F 3/14* (2013.01); *G09G 3/20* (2013.01); *G09G 2330/023* (2013.01); *G09G 2340/0435* (2013.01)

(58) Field of Classification Search
CPC ................................................ G09G 2330/023
See application file for complete search history.

(56) References Cited

U.S. PATENT DOCUMENTS

2020/0081517 A1* 3/2020 Holland ................ G06F 1/3218

FOREIGN PATENT DOCUMENTS

CN          108337363 A       7/2018
CN          110175066 A       8/2019
(Continued)

OTHER PUBLICATIONS

International Search Report issued on Nov. 24, 2022 for International Patent Application No. PCT/CN2022/116116.

(Continued)

*Primary Examiner* — Gustavo Polo
(74) *Attorney, Agent, or Firm* — Ladas & Parry, LLP

(57) ABSTRACT

A screen display method, an electronic device, and a non-transitory computer storage medium are provided. The electronic device at least includes a display screen, a first processor configured to run a first system, and a second processor configured to run a second system. Power consumption during an operation of the second system is lower than a power consumption during an operation of the first system. The screen display method includes: during the operation of the first system, controlling, by the first system, a display screen to enter an AOD mode, in a case where the a first AOD condition is met in the electronic device.

18 Claims, 6 Drawing Sheets

During operation of the first system, controlling, by a first system, a display screen to enter an AOD mode, in response to a first AOD condition being met in an electronic device — S301

Transmitting, by the first system, an AOD switching instruction to the second system, in response to a second AOD condition being met in an electronic device — S302

(56)        References Cited

FOREIGN PATENT DOCUMENTS

| CN | 110989882 A | 4/2020 |
| CN | 112992135 A | 6/2021 |
| CN | 113031742 A | 6/2021 |
| CN | 113031751 A | 6/2021 |
| WO | 2021109875 A1 | 6/2021 |

OTHER PUBLICATIONS

Written Opinion issued on Nov. 24, 2022 for International Patent Application No. PCT/CN2022/116116.

* cited by examiner

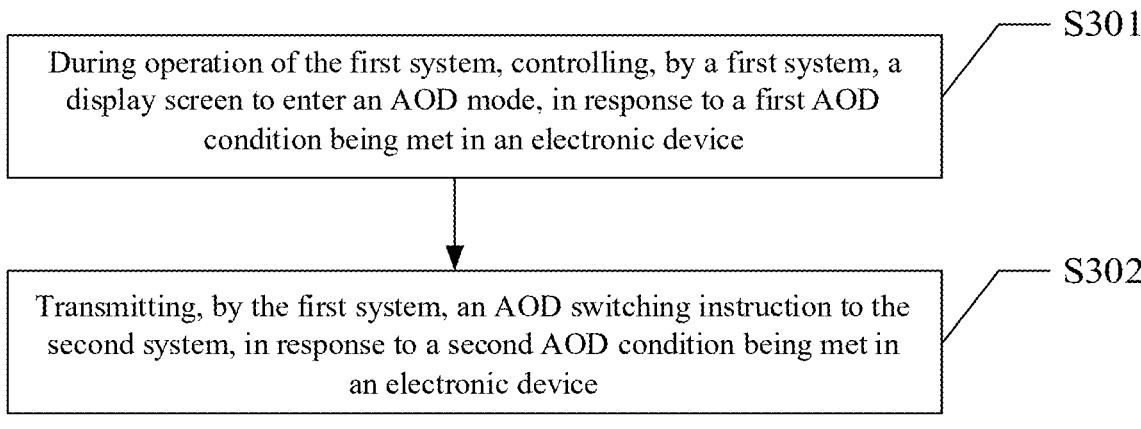

S301

During operation of the first system, controlling, by a first system, a display screen to enter an AOD mode, in response to a first AOD condition being met in an electronic device

S302

Transmitting, by the first system, an AOD switching instruction to the second system, in response to a second AOD condition being met in an electronic device

FIG. 3

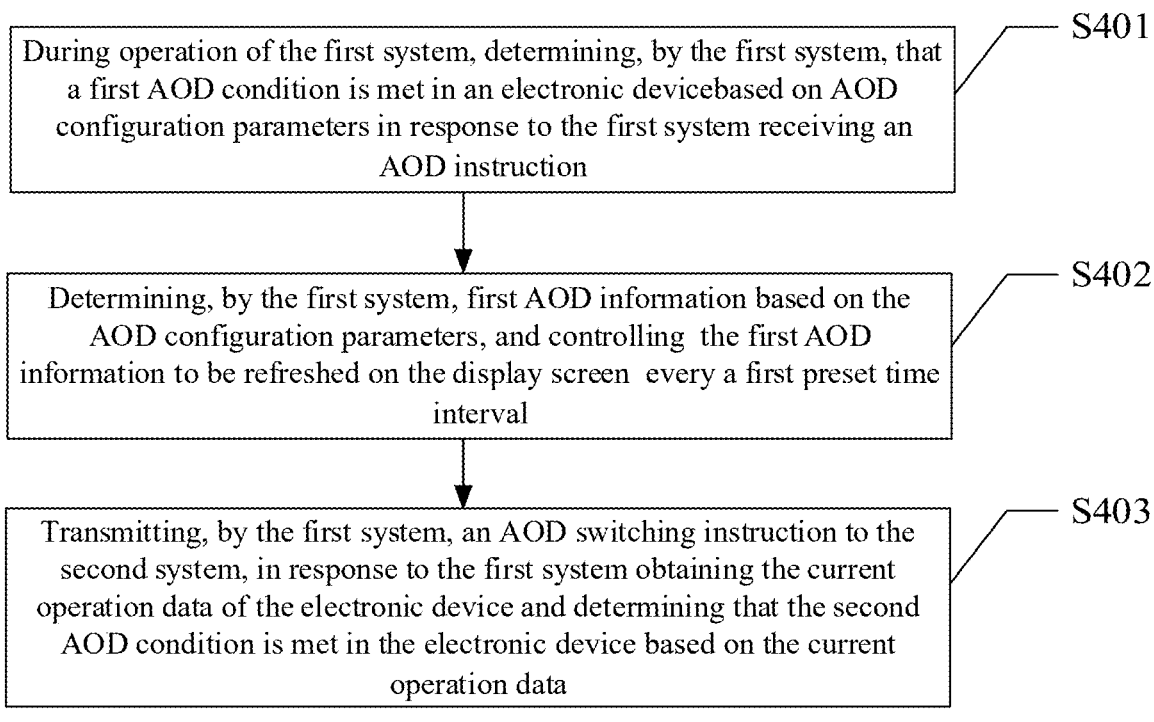

S401

During operation of the first system, determining, by the first system, that a first AOD condition is met in an electronic devicebased on AOD configuration parameters in response to the first system receiving an AOD instruction

S402

Determining, by the first system, first AOD information based on the AOD configuration parameters, and controlling the first AOD information to be refreshed on the display screen every a first preset time interval

S403

Transmitting, by the first system, an AOD switching instruction to the second system, in response to the first system obtaining the current operation data of the electronic device and determining that the second AOD condition is met in the electronic device based on the current operation data

FIG. 4

SCREEN DISPLAY METHOD, STORAGE MEDIUM, AND ELECTRONIC DEVICE FOR REDUCING POWER CONSUMPTION OF THE AOD MODE

CROSS REFERENCE TO RELATED APPLICATIONS

The present application is a 35 U.S.C. 371 National Phase Application of International Patent Application No. PCT/CN2022/116116, filed Aug. 31, 2022, which claims foreign priority to Chinese Patent Application No. 202111280623.5, filed Oct. 29, 2021, and titled "SCREEN DISPLAY METHOD, APPARATUS, STORAGE MEDIUM, AND ELECTRONIC DEVICE", both of which are hereby incorporated by reference in their entireties.

TECHNICAL FIELD

The present disclosure relates to the technical field of electronic design, in particularly to a screen display method, a storage medium, and an electronic device.

BACKGROUND

A screen of an electronic device may be configured to display various interfaces, and always on display (AOD) is a screen display mode in the electronic device. The AOD means that some areas of the screen remain lighting to display information such as the time when the electronic device is in a screen-off state. Most electronic devices have the AOD function, which allows users to view time and other information conveniently when the electronic devices are in a locking state.

SUMMARY

In a first aspect, a screen display method is provided and is performed by an electronic device. The electronic device at least includes a display screen, a first processor, and a second processor. The first processor is configured to run a first system, the second processor is configured to run a second system, and a power consumption during an operation of the second system is lower than a power consumption during an operation of the first system. The method includes: during the operation of the first system, controlling, by the first system, a display screen to enter an AOD mode, in a case where the a first AOD condition is met in the electronic device.

In a second aspect, an electronic device is provided and includes a memory, a processor, and a computer program stored in the memory and executable by the processor. The computer program is configured to be loaded by the processor and perform any one of the methods mentioned above.

In a third aspect, a non-transitory computer storage medium provided and stores a plurality of instructions, wherein the plurality of instructions are configured to be loaded by a processor and perform any one of the methods mentioned above.

BRIEF DESCRIPTION OF THE DRAWINGS

In order to make the technical solutions described in embodiments of the present disclosure or the related art more clearly, the drawings used for description of some embodiments or the related art are described. Apparently, the drawings in the following description only illustrate some embodiments of the present disclosure. For those skilled in the art, other drawings may be acquired according to the drawings without any creative work.

FIG. 3 is a flowchart of a screen display method according to some embodiments of the present disclosure.

FIG. 4 is a flowchart of a screen display method according to some embodiments of the present disclosure.

DETAILED DESCRIPTIONS

Figure 1:
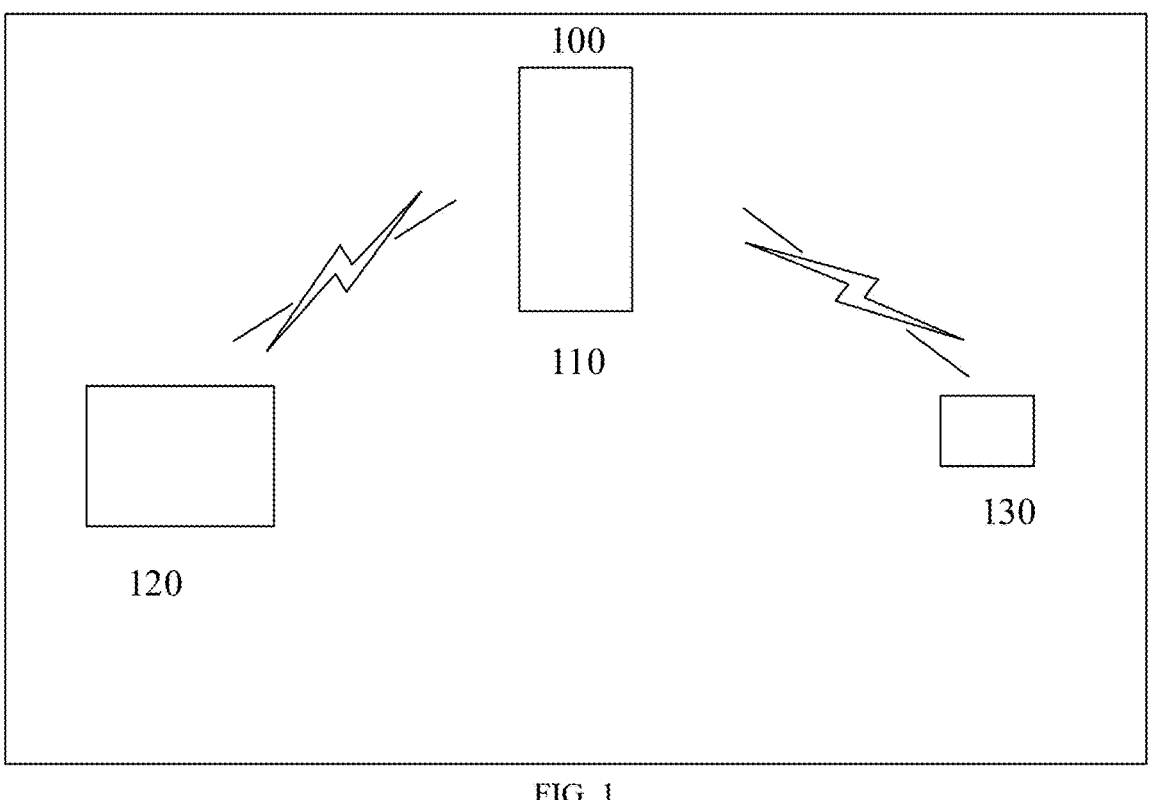
FIG. 1 is a schematic diagram of a system architecture of a screen display method according to some embodiments of the present disclosure.

In order to better understand features and technical effects of the present disclosure, the technical solutions in embodiments of the present disclosure are clearly and completely described in conjunction with the drawings in the embodiments of the present disclosure. It is obvious that the described embodiments are only some embodiments of the present disclosure, and not all embodiments. All other embodiments acquired by those skilled in the art based on the embodiments in the present disclosure without the creative work are all within the scope of the present disclosure.

When referring to the drawings, unless otherwise indicated, the same reference label in different drawings represent the same or similar elements. Implement methods described in the following embodiments do not represent all embodiments consistent with the present disclosure. On the contrary, they are only examples of apparatuses and methods consistent with some aspects of the present disclosure as described in the claims.

A screen display method is provided and is performed by an electronic device. The electronic device at least includes a display screen, a first processor, and a second processor. The first processor is configured to run a first system, the second processor is configured to run a second system, and a power consumption during an operation of the second system is lower than a power consumption during an operation of the first system. The method includes:

during the operation of the first system, controlling, by the first system, a display screen to enter an AOD mode, in a case where the a first AOD condition is met in the electronic device; and transmitting, by the first system, an AOD switching instruction to the second system, in a case where the a second AOD condition is met in the electronic device; the AOD switching instruction is configured to indicate the second system to control the display screen to enter the AOD mode.

In some embodiments, the second AOD condition being met in the electronic device, includes: obtaining, by the first system, current operation data of the electronic device, and determining that the second AOD condition is met in the electronic device based on the current operation data.

In some embodiments, the determining that the second AOD condition is met in the electronic device based on the current operation data, includes: obtaining a service currently processed by the first system based on the current operation data, and determining that the second AOD condition is met in the electronic device in a case where the service currently processed by the first system does not include a preset service.

In some embodiments, the controlling, by the first system, a display screen to enter an AOD mode, in a case where the a first AOD condition is met in the electronic device, includes: determining that the first AOD condition is met in the electronic device based on AOD configuration parameters, in a case where the first system receives a screen-off instruction; determining first AOD information based on the AOD configuration parameters, and controlling the first AOD information to be refreshed on the display screen every a first preset time interval.

In some embodiments, the determining that the first AOD condition is met in the electronic device based on AOD configuration parameters, includes: determining that the first AOD condition is met in the electronic device, in a case where that an AOD function is enabled and a current time is within a duration in which the AOD is enabled is determined based on the AOD configuration parameters.

In some embodiments, in a case where the second AOD condition is met in the electronic device, the method further includes: transmitting, by the first system, the first AOD information to the second system, such that the second system determines second AOD information based on the first AOD information.

In some embodiments, the AOD switching instruction being configured to indicate the second system control display screen to enter the AOD mode includes: the AOD switching instruction being configured to indicate the second system to control the display screen to display the second AOD information.

In some embodiments, the second system controls the second AOD information to be refreshed on the display screen every a second preset time interval.

In some embodiments, the second AOD information is determined based on the first AOD information, and an initial display position of the second AOD information on the display screen is different from a final display position of the first AOD information on the display screen.

In some embodiments, after the second system controls the display screen to enter the AOD mode, the second system controls the display screen to exit the AOD mode in a case where a third AOD condition is not met in the electronic device.

In some embodiments, the first system enters a sleep state after the first system transmits the AOD switching instruction to the second system.

In some embodiments, after the first system enters the sleep state, the method further includes: exiting, by the first system, the sleep state in a case where the first system receives interrupt information, and transmitting an AOD exited instruction to the second system; the AOD exited instruction is configured to indicate the second system to control the display screen to exit the AOD mode.

In some embodiments, the interrupt information includes at least one of external operation information, application notification information, and system notification information.

A screen display apparatus is provided and is arranged in an electronic device. The electronic device includes at least a display screen, a first processor, and a second processor. The first processor is configured to run a first system, the second processor is configured to run a second system, and a power consumption during an operation of the second system is lower than a power consumption during an operation of the first system. The screen display device includes: an AOD module, configured to control the first system to control the display screen to enter an AOD mode, in a case where a first AOD condition is met in the electronic device, during the operation of the first system; and an AOD switching module, configured to control the first system to transmit an AOD switching instruction to the second system in a case where a second AOD condition is met in the electronic device; the AOD switching instruction is configured to indicate the second system to control the display screen to enter the AOD mode.

In some embodiments, the AOD switching module is further configured to: control the first system to obtain current operation data of the electronic device, and determine that the second AOD condition is met in the electronic device based on the current operation data.

In some embodiments, the AOD switching module is further configured to: obtain a service currently processed by the first system based on the current operation data, and determine that the second AOD condition is met in the electronic device in a case where the service currently processed by the first system does not include a preset service.

In some embodiments, the AOD module is further configured to: determine that the first AOD condition is met in the electronic device based on AOD configuration parameters, in a case where the first system receives a screen-off instruction; and determine first AOD information based on the AOD configuration parameters, and control the first AOD information to be refreshed on the display screen every a first preset time interval.

In some embodiments, the AOD module is further configured to: determine that the first AOD condition is met in the electronic device, in a case where that an AOD function is enabled and a current time is within a duration in which the AOD is enabled is determined based on the AOD configuration parameters.

A computer storage medium is provided and store multiple instructions, the multiple instructions are configured to be loaded by a processor and perform any one of the methods mentioned above.

A terminal is provided and includes a memory, a processor, and a computer program stored in the memory and executable by the processor. The computer program is configured to be loaded by the processor and perform any one of the methods mentioned above.

FIG. 1 is a schematic diagram of a system architecture of a screen display method according to some embodiments of the present disclosure.

As shown in FIG. 1, the system architecture may at least include a display screen 110, a first processor 120, and a second processor 130, which are arranged in the electronic device 100.

When the electronic device is a hardware, it may be various electronic devices, including but not limited to a wearable device, a smartphone, a tablet, a laptop, or a desktop computer, etc. When the electronic device is a software, it may be installed in any one of the electronic devices listed above, and may be implemented as multiple softwares or software modules (such as for providing distributed services), or as a single software or software module, which is not limited.

In some embodiments, organic light emitting diodes (OLED) may be configured to make the display panel of the display screen. In some embodiments, active matrix organic light emitting diodes (AMOLED) may be configured to make the display panel. In some embodiments, the display screen may be a liquid crystal display (LCD), which is constructed by placing a liquid crystal cell between two parallel glass substrates. A thin film transistor (TFT) is arranged on a lower substrate glass, and a color filter is arranged on an upper substrate glass. Rotation directions of liquid crystal molecules are controlled by changing the signal and voltage on the TFT, thereby controlling polarized light of each pixel to emit to achieve the display purpose. In addition, other types of display screens may be used, and the display principle and specific structure of the display screen are not limited.

In some embodiments, the first processor is configured to run the first system, and the second processor is configured to run the second system. The power consumption during an operation of the second system is lower than the power consumption during an operation of the first system. The first processor and the second processor are connected to the display screen through a communication bus and are electrically connected to the display screen. The communication bus may be an inter-integrated circuit (I2C) bus or a serial peripheral interface (SPI) bus. In other embodiments, other formats of communication buses may be configured, which are not limited.

It should be understood that the numbers of the electronic device, the display screen, the first processor, and the second processor in FIG. 1 are illustrative, and may be any number according to implementation needs.

Figure 2:
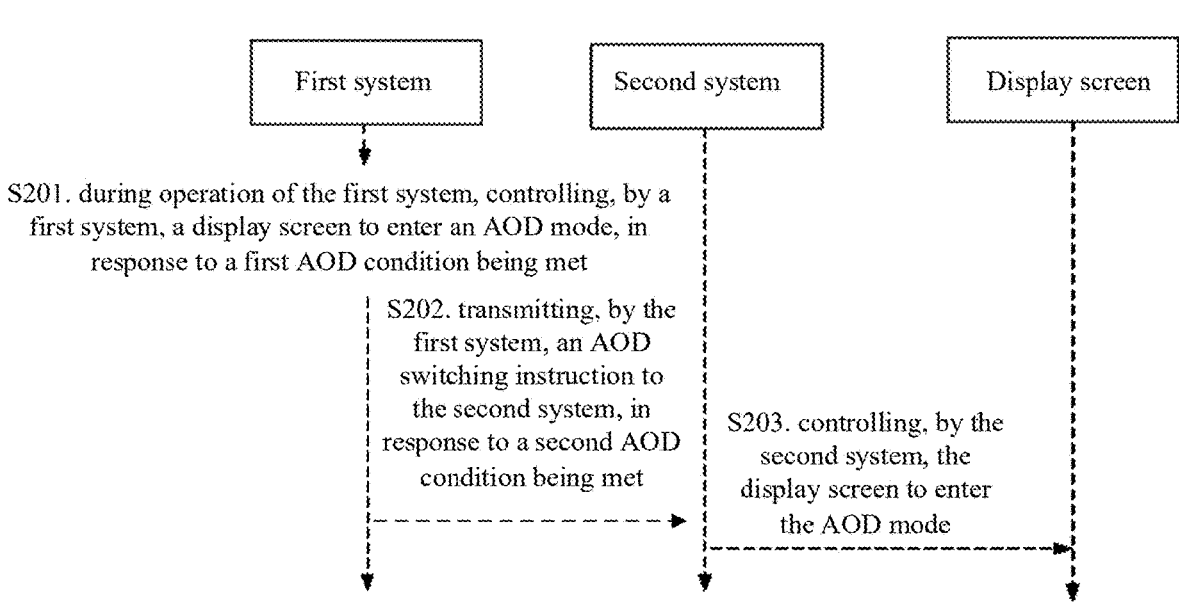
FIG. 2 is a diagram of system interaction of a screen display method according to some embodiments of the present disclosure.

As shown in FIG. 2, FIG. 2 is a diagram of system interaction of a screen display method according to some embodiments of the present disclosure. A system interaction process in a screen display method is described below in conjunction with FIG. 1 and FIG. 2.

At an operation S201, during the operation of the first system, controlling, by a first system, a display screen to enter an AOD mode, in a case where a first AOD condition is met in the electronic device.

In some embodiments, the controlling, by a first system, the display screen to enter an AOD mode, in a case where a first AOD condition is met in the electronic device, includes: determining that the first AOD condition is met in the electronic device based on AOD configuration parameters, in a case where the first system receives a screen-off instruction; determining first AOD information based on the AOD configuration parameters, and controlling the first AOD information to be refreshed on the display screen every a first preset time interval.

In some embodiments, the determining that the first AOD condition is met in the electronic device based on AOD configuration parameters includes: determining that the first AOD condition is met in the electronic device, in a case where that an AOD function is enabled and a current time being within a duration in which the AOD is enabled is determined based on the AOD configuration parameters.

At an operation S202, transmitting, by the first system, an AOD switching instruction to the second system, in a case where a second AOD condition is met in the electronic device.

In some embodiments, the first system obtains the current operation data of the electronic device, and determines that the second AOD condition is met in the electronic device based on the current operation data.

In some embodiments, the determining that the second AOD condition is met in the electronic device based on the current operation data, includes: obtaining a service currently processed by the first system based on the current operation data, and determining that the second AOD condition is met in the electronic device in a case where the second system is capable of processing the service currently processed by the first system.

In some embodiments, in a case where the second AOD condition is met in the electronic device, the method further includes: transmitting, by the first system, the first AOD information to the second system, such that the second system determines second AOD information based on the first AOD information.

The AOD switching instruction is configured to indicate the second system to control the display screen to enter the AOD mode.

At an operation S203, controlling, by the second system, the display screen to enter the AOD mode.

In some embodiments, the AOD switching instruction being configured to indicate the second system to control the display screen to enter the AOD mode, includes: the AOD switching instruction being configured to indicate the second system to control display screen to display second AOD information.

In some embodiments, the second system controls the second AOD information to be refreshed on the display screen every a second preset time interval. The second AOD information is determined based on the first AOD information, and an initial display position of the second AOD information on the display screen is different from a final display position of the first AOD information on the display screen.

In some embodiments, after the second system controls the display screen to enter the AOD mode, the second system controls the display screen to exit the AOD mode in a case where a third AOD condition is not met in the electronic device.

In some embodiments, after the first system transmit the AOD switching instruction to the second system, the first system enters a sleep state.

In some embodiments, after the first system enters the sleep state, the screen display method further includes: exiting, by the first system, the sleep state in a case where the first system receives interrupt information, and transmitting an AOD exited instruction to the second system. The AOD exited instruction is configured to indicate the second system to control the display screen to exit the AOD mode.

In some embodiments, the interrupt information is at least one of external operation information, application notification information, and system notification information.

In embodiments of the present disclosure, firstly, during the operation of the first system, when the electronic device meets the first AOD condition, the first system controls the display screen to enter the AOD mode. Then, when the electronic device meets the second AOD condition, the first system transmits the AOD switching instruction to the second system, and the AOD switching instruction is configured to indicate the second system to control the display screen to enter the AOD mode. In this way, when the electronic device meets the first AOD condition, the first system may first control the display screen to enter the AOD mode. When the electronic device meets the second AOD condition, the first system may be switched to the second system to control the display screen to enter the AOD mode.

Since the power consumption during an operation of the second system is lower than the power consumption during an operation of the first system, the power consumption of the AOD mode controlled by the first system is reduced and the battery life of the electronic device is extended.

As shown in FIG. 3, FIG. 3 is a flowchart of a screen display method according to some embodiments of the present disclosure. In some embodiments, the performing subject may be an electronic device, a first system in the electronic device, or a related service performing the screen display method in the electronic device. For the convenience of description, the first system in the electronic device being the performing subject is taken as an example to introduce the screen display method. As shown in FIG. 3, the screen display method may include following operations.

At an operation S301, during an operation of the first system, controlling, by a first system, a display screen to enter an AOD mode, in a case where a first AOD condition is met in the electronic device.

In some embodiments, the screen display method is applied in the electronic device that have the AOD function or is capable of achieving the AOD function. The AOD is a screen display mode in the electronic device and is also called as AOD technology, which is an abbreviation of always on display. The AOD means that some areas of the screen remain lighting to display preset information when the electronic device is in a locked state. Therefore, when the electronic device is in the locked state, the user may view the preset information through the AOD function, thereby improving the convenience of using the electronic device.

However, a problem in a related AOD technology is that the electronic device is required to constantly refresh screen content (such as refresh time and other information) during an AOD process. Therefore, even if some areas of the display screen remain lighting, the entire system of the electronic device cannot sleep, resulting in high power consumption of the entire system of the electronic device during the AOD process. Therefore, the related AOD technology is not conducive to being applied in a power sensitive device such as a mobile wearable device. For the aforementioned problem, the present disclosure provides a screen display method.

Firstly, it may be clarified that, in some embodiments of the present disclosure, the electronic device at least includes a display screen, a first processor, and a second processor. The first processor may be served as a master control system on chip (SOC) of the electronic device. The second processor may be a low-power slave control SOC. Compared with the power consumption during an operation of the first processor, power consumption during an operation of the second processor is much lower, the second processor has much lower frequency and smaller memory capacity.

In some embodiments, the first processor may control the work of the electronic device based on the first system, and the second processor may control the work of the electronic device based on the second system. It may be understood that the first system and the second system may be different systems, and resources required for running the second system are less than those required for running the first system. The resources may include storage space, computation, frequency, and required power, etc. Therefore, when the first processor is configured to run the first system and the second processor is configured to run the second system, the power consumption during an operation of the second system is lower than the power consumption during an operation of the first system. For example, the first system may be an Android system, a Linux system, a Windows system, or an iOS system, etc., and the second system may be a real-time operating system (RTOS). The electronic device may run the first system based on the first processor, or run the second system based on the second processor. It should be noted that the first system and the second system are two independent systems.

The first system and the second system may form a collaborative dual-system. The two systems interact with each other to complete the functions of the hardware electronic device. In the collaborative dual-system architecture, data exchange and communication between the two systems may be achieved. It may be understood that the present disclosure is introduced based on the electronic device including the first processor, the second processor, and the corresponding two systems forming the collaborative dual-system. However, the technical implementation scheme mentioned in this solution is not limited to the collaborative dual-system, and includes the AOD and switching, for example, between three processors and systems, and more processors and systems.

In some embodiments, when the first processor is a main processing chip, the first system corresponding to the first processor is a system mainly used by the electronic device during an operation of the electronic device. It may be considered that after the electronic device is started, the first processor may run the first system and implement most of functions and operations of the electronic device based on the first system. In some embodiments, the first system may obtain a control right of the display screen to control the display screen to display an interface corresponding to the first system, and control the display screen to display a feedback of the first system after the user's operation. For example, the first system may display a system desktop corresponding to the first system through the display screen, the system desktop displays icons of application programs. When the user clicks on an icon displayed on the display screen, the display screen obtains the icon information input by the user to determine an application program required to be launched, then the first system runs the application program and displays a running result of the application program on the display screen.

In some embodiments, during an operation of the first system, the user may set parameters such as whether to enable the AOD function and the specific content to be displayed after the AOD function is started. During an operation of the first system, the above settings or parameters may be configured to judge whether an AOD condition is met in the electronic device, which is whether a first AOD condition is met in the electronic device. In a case where the first system determines that the first AOD condition is met in the electronic device, the electronic device is currently required to enter the AOD mode. At this time, since the first system has the control right of the display screen, the first system may directly determine content of AOD based on the above settings or parameters for AOD, and display the content on the display screen.

At an operation S302, transmitting, by the first system, an AOD switching instruction to the second system, in a case where the a second AOD condition is met in the electronic device.

In some embodiments, after the first system controls the display screen to enter the AOD mode, the first system is required to continuously refresh the content of the display screen (such as refreshing time and other information). Therefore, even if some areas of the display screen remain lighting, the first system cannot sleep, resulting in a relatively high power consumption of the entire system of the electronic device during the AOD process.

One feasible approach is that although the content on the display screen is controlled to continuously be refreshed in the electronic device during the AOD process, controlling the display screen to continuously refresh the content requires low processing capability of a processing chip since the content displayed on the display screen is relatively simple. Therefore, controlling the display screen to continuously refresh the content may be performed by a second processor with a low processing capability. Since the power consumption during which the second processor runs the second system is much lower the power consumption during which the first processor runs the first system, controlling the display screen to enter the AOD mode through the second system may greatly reduce the power consumption during which the AOD mode runs normally, thereby improving the battery life of the electronic device.

In some embodiments, after it is determined that the first AOD condition is met in the electronic device, the operation of controlling the display screen to enter the AOD mode is not directly handed over to the second system to perform. That is, in some embodiments, there is no a case where the first system is set to process a normal service and the second system is set to only control the display screen to enter the AOD mode. The purpose is that before it is determined that the first AOD condition is met in the electronic device, the electronic device runs normally. At this time, the electronic device is required to process various complex user needs and functions based on a strong processing capability of the first system. Therefore, before it is determined that the first AOD condition is met in the electronic device, the first system may be communicated with other components in the electronic device, or the first system may be processing a complex service or particular service (such as a service that cannot be processed by the second system, or a service requiring a high processing capability, or a service requiring being run continuously, or a service defined by the user to be run under the first system and not run in the second system), or a certain application program pre-set in the first system is required to be processed by the first system. After it is determined that the first AOD condition is met in the electronic device, when the control right of the display screen is forcibly handed over to the second system and the first system is controlled to enter a sleep state, abnormal data and functions in the first processor or the first system are caused, and in severe cases, damage to the first processor or the first system is caused. For the user, the first system and the second system work based on different systems, the user views frame loss and lagging on the display screen when the control right of the display screen is forcibly handed over to the second system. On the other hand, when only the second system is set to control the display screen to enter the AOD mode, the first system also cannot control the display screen to enter the AOD mode if the second system fails and cannot control the display screen to enter the AOD mode. In this case, the electronic device cannot control the display screen to enter the AOD mode.

Therefore, in some embodiments, when the first system determines that the first AOD condition is met in the electronic device, the first system controls the display screen to enter the AOD mode. After the first system controls the display screen to enter the AOD mode, the first system may judge whether the second AOD condition is met in the electronic device based on an operation condition of the electronic device, such that the first system may choose whether to make the second system control the display screen to enter the AOD mode based on whether the second AOD condition is met in the electronic device.

After the first system judges that the second AOD condition is met in the electronic device based on the operation condition of the electronic device, when the first system determines that the second AOD condition is met in the electronic device, the first system may transmit an AOD switching instruction to the second system. The AOD switching instruction is configured to indicate the second system to obtain control right of the display screen and control the display screen to enter the AOD mode. Therefore, after receiving the AOD switching instruction transmitted by the first system, the second system controls the display screen to enter the AOD mode.

The second AOD condition is met in the electronic device may be considered as the second system meeting the AOD condition. The second system meeting the AOD condition may means that the first system is not being communicated with other components in the electronic device, or the first system is not processing a complex service, or no application program is required to be currently run by the first system. In this case, the first system may enter the sleep state. When the first system is in the sleep state, the first system may not process data, or some or all electronic components in the first system may be powered off to reduce the power consumption caused by the operation of the first system.

On the other hand, the first system firstly controls the display screen to enter the AOD mode, and then when the second system meets the AOD condition, that is, when the AOD mode is controlled by the second system, there is no effects on the second system. Thus, when the second system controls the display screen to enter the AOD mode, for the user's visual experience, the AOD looks like being completed by one processor or system, thereby improving the user's experience of the AOD function.

In embodiments of the present disclosure, firstly, during an operation of the first system, when the first AOD condition is met in the electronic device, the first system controls the display screen to enter the AOD mode. Then, when the second AOD condition is met in the electronic device, the first system transmits the AOD switching instruction to the second system, and the AOD switching instruction is configured to indicate the second system to control the display screen to enter the AOD mode. In this way, when the first AOD condition is met in the electronic device, the first system may firstly control the display screen to enter the AOD mode. When the second AOD condition is met in the electronic device, the first system may be switched to the second system to control the display screen to enter the AOD mode. Since the power consumption during an operation of the second system is lower than the power consumption during an operation of the first system, the power consumption of the AOD mode controlled by the first system is reduced and the battery life of the electronic device is extended.

As shown in FIG. 4, FIG. 4 is a flowchart of a screen display method according to some embodiments of the present disclosure.

As shown in FIG. 4, the method includes following operations.

At an operation S401, during an operation of the first system, determining, by the first system, that a first AOD condition is met in the electronic device based on AOD configuration parameters in a case where the first system receives an AOD instruction.

After the electronic device is started, the first processor may run the first system and implement most of the functions and operations of the electronic device through the first system. The user may set parameters corresponding to the AOD function in the electronic device during an operation of the first system, that is, the user may set AOD configuration parameters. The AOD configuration parameters may include whether to enable the AOD function, specific content of the AOD, starting time of the AOD, and so on.

Figure 5:
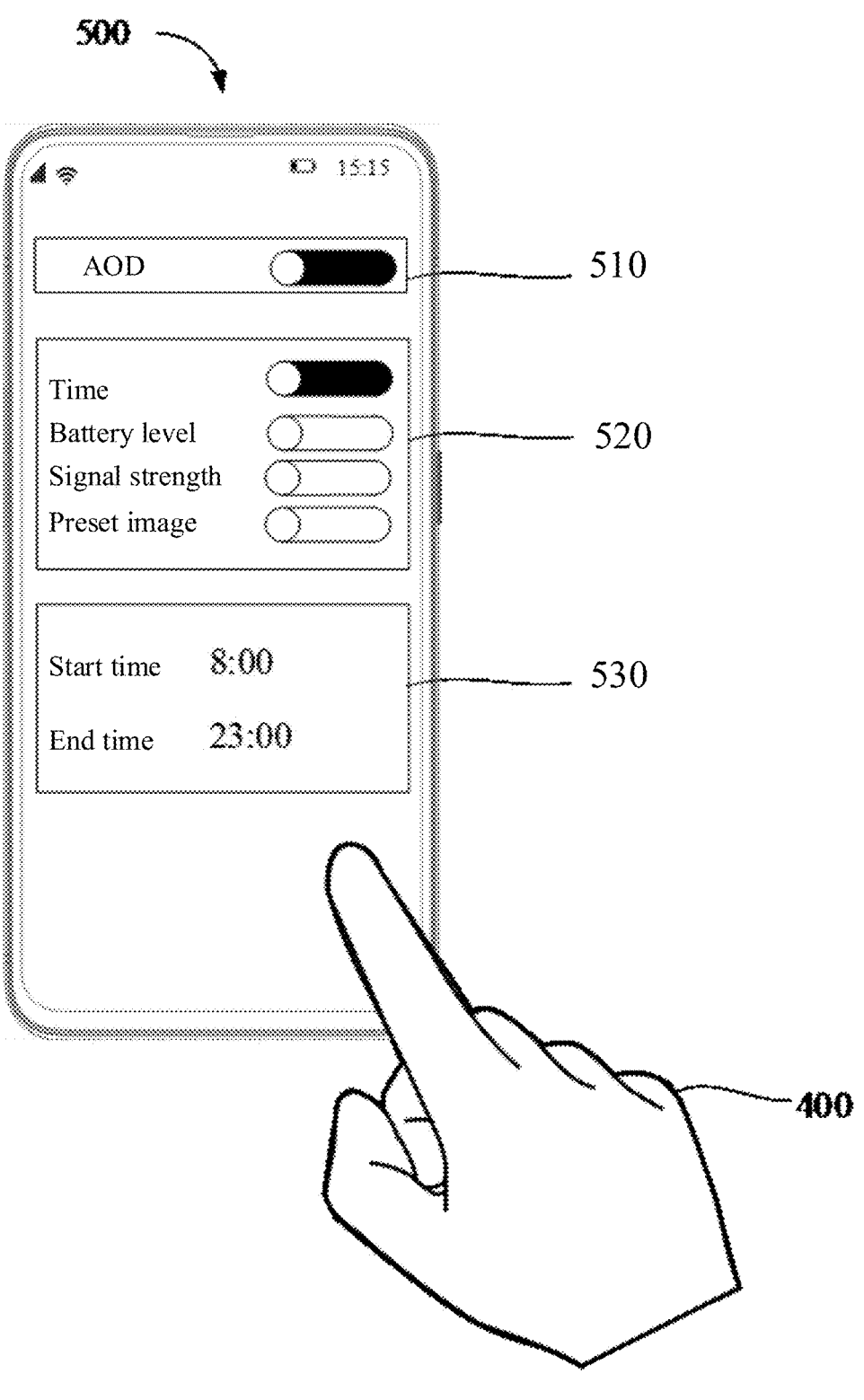
FIG. 5 is a configuration schematic diagram of configuration parameters for AOD according to some embodiments of the present disclosure.

As shown in FIG. 5, FIG. 5 is a schematic diagram of configuration of configuration parameters for AOD according to some embodiments of the present disclosure.

As shown in FIG. 5, in an electronic device 500, by touching the display screen of the electronic device 500, or voice controlling the electronic device 500, etc., a user 400 may operate a first display bar 510 to choose whether to enable the AOD function. For example, lighting a button in the first display bar 510 represents enabling the AOD function. The user 400 may operate a second display bar 520 to select specific content of the AOD. The specific content of the AOD may include displaying a time or digital clock, displaying a battery level, displaying a signal strength of a wireless communication network, displaying an icon of a preset application program, and displaying a preset image, etc. For example, lighting a button corresponding to "time" in the second display bar 520 represents that a current time is displayed on the display screen of the electronic device after the AOD is started. The user may operate a third display bar 530 to select a start time of the AOD. For example, inputting a start time and an end time of the AOD in the third display bar 530 represents that the AOD is remained between the start time and the end time after the AOD is started.

After obtaining the AOD configuration parameters, the first system may continue to operate normally, and may passively receive a screen-off instruction. The screen-off instruction may be actively transmitted by a component or program in the electronic device, for example, when a timer in the electronic device reaches an automatic screen-off time, or the user needs to turn off the display screen and actively transmits the screen-off instruction through a preset button, voice control, or a preset program. The screen-off instruction only represents that the electronic device is required to perform a screen-off operation, but whether the screen-off operation is directly-turning off (no content is displayed on the display screen) or entering the AOD mode is required to judge whether the first AOD condition is met in the electronic device based on the AOD configuration parameters.

For example, when the AOD configuration parameters include whether to enable the AOD function, specific content of the AOD, and a duration in which the AOD is enabled, and the latest AOD configuration parameters include the AOD function being enabled and the current time being within the duration in which the AOD is enabled, the first AOD condition may be considered to be met in the electronic device. On the contrary, when the latest AOD configuration parameters do not include the AOD function being enabled, or the current time being not within the duration in which the AOD is enabled, the first AOD condition may be considered to not be met in the electronic device.

At operation S402, determining, by the first system, first AOD information based on the AOD configuration parameters, and controlling the first AOD information to be refreshed on the display screen every a first preset time interval.

The first system judges whether the first AOD condition is met in the electronic device based on the AOD configuration parameters. When the first system determines that the first AOD condition is met in the electronic device, the first system may determine the first AOD information based on the AOD configuration parameters. The first AOD information is information that the first system controls the display screen to display. Therefore, the first system may control the display screen to display the first AOD information.

In some embodiments, during the first system controlling the display screen to display the first AOD information, the first system may continue to judge whether the first AOD condition is met in the electronic device and receive an external instruction to interrupt the AOD. When the first AOD condition is not met in the electronic device or the external instruction to interrupt the AOD is received, the first system may control the display screen to return to a normal display interface.

Figure 6:
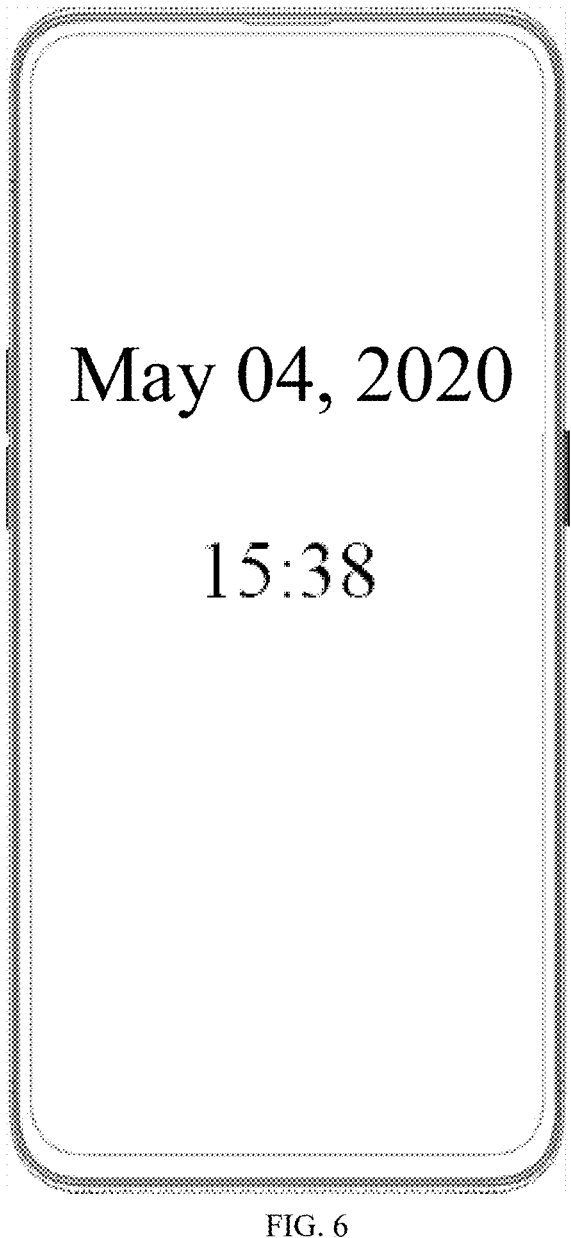
FIG. 6 is a schematic diagram of an example of AOD according to some embodiments of the present disclosure.

As shown in FIG. 6, FIG. 6 is a schematic diagram of an example of an AOD according to some embodiments of the present disclosure.

As shown in FIG. 6, when the latest-obtained AOD configuration parameters include the AOD function being enabled, and the specific contents of AOD is a date, a time, a start time of AOD is 8 o'clock, and an end time of AOD is 20 o'clock, then based on the specific contents of AOD in the AOD configuration parameters, the first AOD information may be determined to be a current date and time of the electronic device, and the current date and time of the electronic device may be displayed on at least one preset position of the display screen.

It should be understood that when content is displayed on a position of the display screen for a long time, abnormal display at the position may be caused, such as uneven display or the presence of ghosting. In some cases, when the first AOD information is the current date and time of the electronic device, the current date and time is required to be updated. Therefore, the first system may control the display screen to refresh the first AOD information every the first preset time interval. The way of refreshing the first AOD information may be updating the content of the first AOD information, or updating the position of the first AOD information on the display screen.

When the first system determines that the first AOD condition is not met in the electronic device, which means that the user may not have enabled the AOD function or the current time is not within the duration in which the AOD is enabled, the display screen may be directly controlled to be turned off (no content is displayed on the display screen).

At operation S403, transmitting, by the first system, an AOD switching instruction to the second system, in a case where the first system obtains the current operation data of the electronic device and determining that the second AOD condition is met in the electronic device based on the current operation data.

In some embodiments, after the first system controls the display screen to enter the AOD mode, the first system is required to continuously refresh the content on the display screen (such as refreshing the displayed time and other information). Therefore, even if some areas of the display screen remain lighting, the first system cannot sleep, resulting in a relatively high power consumption of the entire system of the electronic device during the AOD process.

One feasible approach is that although the content on the display screen is controlled to continuously be refreshed in the electronic device during the AOD process, controlling to continuously refresh the content on the display screen requires low processing capability of a processing chip since the content displayed on the display screen is relatively simple. Therefore, controlling continuously refresh the content on the display screen may be performed by a second processor with a low processing capability. Since the power consumption during which the second processor runs the second system is much lower the power consumption during which the first processor runs the first system, controlling the display screen to enter the AOD mode through the second system may greatly reduce the power consumption during the AOD mode running normally, thereby improving the battery life of the electronic device.

In some embodiments, after it is determined that the first AOD condition is met in the electronic device, the operation of controlling the display screen to enter the AOD mode is not directly handed over to the second system to perform. That is, in some embodiments, there is no a case where the first system is set to process a normal service and the second system is set to only control the display screen to enter the AOD mode. The purpose is that before it is determined that the first AOD condition is met in the electronic device, the electronic device runs normally. At this time, the electronic device is required to process various complex user needs and functions based on a strong processing capability of the first system. Therefore, before it is determined that the first AOD condition is met in the electronic device, the first system may be communicated with other components in the electronic device, or the first system may be processing a complex service, or a certain application program pre-set in the first system is required to be processed by the first system. After it is determined that the first AOD condition is met in the electronic device, when the control right of the display screen is forcibly handed over to the second system and the first system is controlled to enter a sleep state, abnormal data and functions in the first processor or the first system are caused, and in severe cases, damage to the first processor or the first system is caused. For the user, the first system and the second system work based on different systems, the user views frame loss and lagging on the display screen when the control right of the display screen is forcibly handed over to the second system. On the other hand, when only the second system is set to control the display screen to enter the AOD mode, the first system also cannot control the display screen to enter the AOD mode if the second system fails and cannot control the display screen to enter the AOD mode. In this case, the electronic device cannot control the display screen to enter the AOD mode.

Therefore, in some embodiments, when the first system determines that the first AOD condition is met in the electronic device, the first system controls the display screen to enter the AOD mode. After the first system controls the display screen to enter the AOD mode, the first system obtains current operation data of the electronic device every a preset time interval and obtains a service currently processed by the first system based on the current operation data. The service currently processed by the first system may include a communication situation between the first system and other components in the electronic device, a processing situation of a current task of the first system, and an application program currently run by the first system, etc. The first system may further judge whether there is a preset service in the service currently processed by the first system. Since a performance of the second processor corresponding to the second system is lower than that of the first processor corresponding to the first system, the service processed by the first system cannot be all processed by the second system. Therefore, the preset service may be a service that the second system cannot process, or a service requiring high processing capability, a service running continuously, and a service defined by the user to be run under the first system and not run in the second system. For example, the preset service may be a corresponding service that the second system cannot achieve communication with preset components in the electronic device, a complex data processing task that the second system cannot achieve, or a service corresponding to a preset application program that the second system cannot run, etc.

After the first system judges whether the second AOD condition is met in the electronic device based on an operation status of the electronic device, when the first system determines that the second AOD condition is met in the electronic device, which means that the service currently processed by the first system does not include the preset service, the first system may transmit the first AOD information to the second system. The first system may transmit an AOD switching instruction to the second system, which means that the first system switch the display right of the display screen to the second system. The AOD switching instruction is configured to indicate the second system to control the display screen to enter the AOD mode.

After the first system judges whether the second AOD condition is met by the second system based on an operation status of the electronic device, when the first system determines that the second AOD condition is not met by the second system, the first system may continue to obtain the current operation data of the electronic device every the preset time interval and judge whether the second AOD condition is met by the second system, until that the second AOD condition is met by the second system.

The second AOD condition is met by the second system represents that the first system is not being communicated with a preset component in the electronic device, or the first system is not processing a complex task, or the second system is not running a preset application. In this case, the first system may enter the sleep state. When the first system is in the sleep state, the first system may not perform data processing, or some or all electronic components of the first system may be powered off to reduce the power consumption caused by the operation of the first system. On the other hand, the first system may control the display screen to enter the AOD mode, and when the AOD condition is met by the second system, there is no effect on the second system when the AOD mode is controlled by the second system. Thus, the second system controls the display screen to enter the AOD mode. For the user's visual experience, the AOD looks like being completed by one processing chip or system, thereby improving the user's experience of the AOD function.

In some embodiments, after receiving the AOD switching instruction and the first AOD information transmitted by the first system, the second system determines the second AOD information based on the first AOD information and controls the display screen to display the second AOD information.

In some embodiments, the first AOD information not only includes the specific displayed contents which are determined based on the AOD configuration parameters and is displayed on the electronic device in the AOD mode, but also carries the position information of which the first AOD information is last displayed on the display screen when the first system transmits the first AOD information. After receiving the first AOD information, the second system may directly use display content of the first AOD information as the second AOD information, determine a new display position on the display screen based on the position information of which the first AOD information is last displayed on the display screen, and display the second AOD information at the new display position. That is, an initial display position of the second AOD information on the display screen is different from a final display position of the first AOD information on the display screen.

The purpose of determining a new display position on the display screen is that after the first system switches the display right of the display screen to the second system, the second system needs to redisplay the AOD information on the display screen. That is, the first AOD information previously displayed needs to be switched to the second AOD information on the display screen. If a new display position is not determined on the display screen, the user may view that the AOD information only flashes once and the position of the AOD information does not change when the first AOD information is switched to the second AOD information. However, when the first system refreshes the first AOD information, usually, the first AOD information flashes and changes as its position varies, which causes inconvenience to the user. In some embodiments of the present disclosure, after determining the new display position on the display screen, the second system displays the AOD information again at the new display position on the display screen, and the display position of the AOD information itself also changes when the AOD information is refreshed. Therefore, the user cannot realize that the first AOD information is switched to the second AOD information, thereby improving the user experience.

The first system may control the first AOD information to be refreshed on the display screen every the first preset time interval, and the second system may control the second AOD information to be refreshed on the display screen every the second preset time interval based on the AOD switching instruction. The first preset time interval and the second preset time interval may be the same to prevent prolonged display at the same position on the display screen.

In some embodiments, the second system may judge whether a third AOD condition is met in the electronic device every a preset time interval, and control the display screen to exit the AOD mode when the third AOD condition is not met in the electronic device.

When the second system determines that third AOD condition is met in the electronic device, the second system continues to control the display screen to display the second AOD information and judges whether the third AOD condition is met in the electronic device every the preset time interval.

During the second system actively judging whether third AOD condition is met in the electronic device based on the indication of the AOD switching instruction, the second system may judge based on the AOD configuration parameters. For example, if the AOD configuration parameters include the start time and end time of the AOD mode, the second system may determine that the third AOD condition is not met in the electronic device when the second system determines that the current time is not located in a duration between the start time and end time of the AOD mode. In this case, the second system may control the display screen to exit the AOD mode and directly turn off the display screen when the third AOD condition is met in the electronic device.

In some embodiments, the first system exits the sleep state when receiving interrupt information, and transmits an AOD exited instruction to the second system. In some embodiments, the AOD exited instruction is configured to indicate the second system to control the display screen to exit the AOD mode. In some embodiments, the first system may be set to exit the sleep state when receiving the interrupt information, and transmit the AOD exited instruction to the second system. The interrupt information may be external operation information (such as operation information when the user actively turns on the display screen, etc.), application notification information (such as a message received by a chat application, etc.), or system notification information (such as alarm triggering information, phone answering information, or system update information, etc.). At this time, the AOD exited instruction may be transmitted to the second system to indicate the second system to control the display screen to exit the AOD mode based on the AOD exited instruction.

After receiving the AOD exited instruction, the second system controls the display screen to exit the AOD mode. At this time, the first system may obtain the display right of the display screen from the second system and normally display the content corresponding to the interrupt information.

In embodiments of the present disclosure, firstly, during an operation of the first system, when the first AOD condition is met in the electronic device, the first system controls the display screen to enter the AOD mode. Then, when the second AOD condition is met in the electronic device, the first system transmits the AOD switching instruction to the second system, and the AOD switching instruction is configured to indicate the second system to control the display screen to enter the AOD mode. In this way, when the first AOD condition is met in the electronic device, the first system may firstly control the display screen to enter the AOD mode. When the second AOD condition is met in the electronic device, the first system may be switched to the second system to control the display screen to enter the AOD mode. Since the power consumption during an operation of the second system is lower than the power consumption during an operation of the first system, the power consumption of the AOD mode controlled by the first system is reduced and the battery life of the electronic device is extended.

Figure 7:
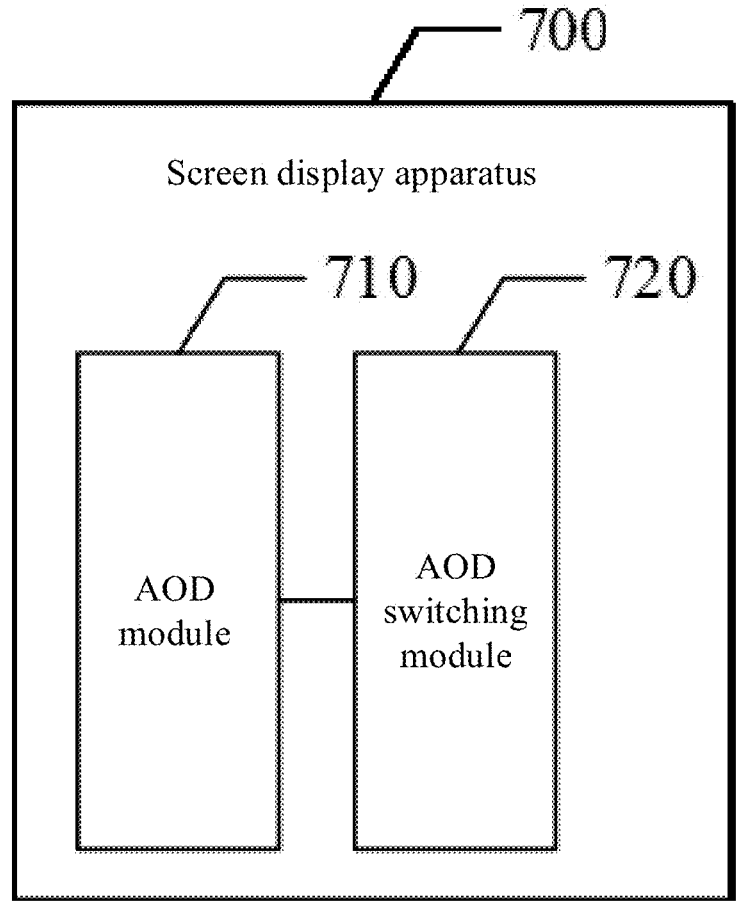
FIG. 7 is a structural schematic diagram of a screen display apparatus according to some embodiments of the present disclosure.

As shown in FIG. 7, FIG. 7 is a structural schematic diagram of a screen display apparatus some embodiments of the present disclosure.

As shown in FIG. 7, a screen display apparatus 700 is arranged in an electronic device, and the electronic device at least includes a display screen, a first processor, and a second processor. The first processor is configured to run the first system, and the second processor is configured to run the second system. The power consumption during an operation of the second system is lower than the power consumption during an operation of the first system. The screen display device 700 includes following components.

The AOD module 710 is configured to: during an operation of the first system, control the first system to control the display screen to enter an AOD mode in a case where the a first AOD condition is met in the electronic device.

The AOD switching module 720 is configured to: control the first system to transmit an AOD switching instruction to the second system in a case where the a second AOD condition is met in the electronic device. The AOD switching instruction is configured to indicate the second system to control the display screen to enter the AOD mode.

In some embodiments, the AOD module 710 is configured to: determine that the first AOD condition is met in the electronic device based on AOD configuration parameters, in a case where the first system receiving a screen-off instruction; determine first AOD information based on the AOD configuration parameters, and control the display screen to refresh the first AOD information every a first preset time interval.

In some embodiments, the AOD module 710 is configured to: determine that the first AOD condition is met in the electronic device, in a case where that an AOD function is enabled and a current time is within a duration in which the AOD is enabled is determined based on the AOD configuration parameters.

The AOD switching module 720 is configured to: control the first system to obtain current operation data of the electronic device, and determine that the second AOD condition is met in the electronic device based on the current operation data.

The AOD switching module 720 is configured to: obtain a service currently processed by the first system based on the current operation data, and determine that the second AOD condition is met in the electronic device in a case where the service currently processed by the first system excludes a preset service.

The screen display device 700 may further include an AOD information transmission module, configured to: control the first system to transmit the first AOD information to the second system, such that the second system determines second AOD information based on the first AOD information.

The AOD switching instruction being configured to indicate the second system control display screen to enter the AOD mode, includes: the AOD switching instruction being configured to indicate the second system to control the display screen to display the second AOD information. The second system controls the second AOD information to be refreshed on the display screen every a second preset time interval. The second AOD information is determined based on the first AOD information, and an initial display position of the second AOD information on the display screen is different from a final display position of the first AOD information on the display screen. After the second system controls the display screen to enter the AOD mode, the second system controls the display screen to exit the AOD mode in a case where a third AOD condition is not met in the electronic device.

The screen display device 700 may further include a sleep module, configured to: control the first system to enter a sleep state after the first system transmits the AOD switching instruction to the second system; control the first system to exit the sleep state in a case where the first system receives interrupt information, and transmit an AOD exited instruction to the second system. The AOD exited instruction is configured to indicate the second system to control the display screen to exit the AOD mode. The interrupt information includes at least one of external operation information, application notification information, and system notification information.

In embodiments of the present disclosure, the screen display apparatus includes the AOD module, configured to: during an operation of the first system, control the first system to control the display screen to enter the AOD mode in a case where the a first AOD condition is met in the electronic device; the AOD switching module, configured to: control the first system to transmit an AOD switching instruction to the second system in a case where the a second AOD condition is met in the electronic device. The AOD switching instruction is configured to indicate the second system to control the display screen to enter the AOD mode. In this way, when the first AOD condition is met in the electronic device, the first system may firstly control the display screen to enter the AOD mode. When the second AOD condition is met in the electronic device, the first system may be switched to the second system to control the display screen to enter the AOD mode. Since the power consumption during an operation of the second system is lower than the power consumption during an operation of the first system, the power consumption of the AOD mode controlled by the first system is reduced and the battery life of the electronic device is extended.

Some embodiments of the present disclosure provide a computer storage medium storing multiple instructions. The multiple instructions are configured to be loaded by a processor and perform any one of the methods mentioned above.

Figure 8:
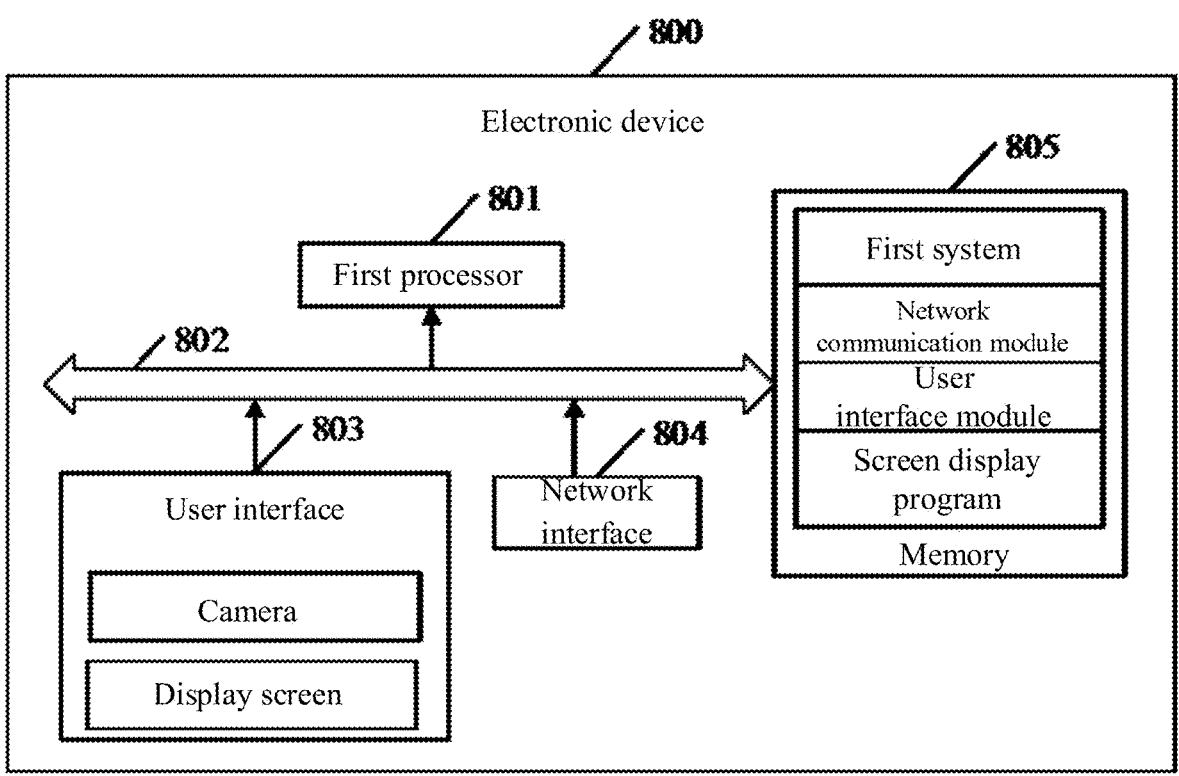
FIG. 8 is a structural schematic diagram of an electronic device according to some embodiments of the present disclosure.

As shown in FIG. 8, FIG. 8 is a structural schematic diagram of an electronic device according to some embodiments of the present disclosure. As shown in FIG. 8, an electronic device 800 at least include a first processor 801 and a second processor (not shown in the figure), the first processor is configured to run the first system, the second processor is configured to run the second system, and the power consumption during an operation of the second system is lower than the power consumption during an operation of the first system. The electronic device 800 at least include a network interface 804, a user interface 803, a memory 805, and at least one communication bus 802.

The communication bus 802 is configured to achieve connection communication between these components.

The user interface 803 may include a display screen and a camera. In some embodiments, the user interface 803 includes a standard wired interface and a wireless interface.

In some embodiments, the network interface 804 includes a standard wired interface and a wireless interface (such as a WI-FI interface).

The first processor 801 may include one or more processing cores. The first processor 801 utilizes various interfaces and circuits to connect various parts of the electronic device 800, and executes various functions and processes data of the electronic device 800 by running or executing instructions, programs, code sets, or instruction sets stored in the memory 805 and calling data stored in the memory 805. In some embodiments, the first processor 801 may be implemented using at least one hardware form from a digital signal processing (DSP), a field-programmable gate array (FPGA), or a programmable logic array (PLA). The first processor 801 may integrate one or a combination of a central processing unit (CPU), a graphics processing unit (GPU), and a modem. The CPU is configured to process a system, a user interface, and an application program, the GPU is configured to render and draw the content to be displayed on the screen, and the modem is configured to handle wireless communication. It may be understood that the above-mentioned modem may not be integrated into the first processor 801 and may be implemented separately through a single chip.

The memory 805 may include a random access memory (RAM) or a read only memory. In some embodiments, the memory 805 includes a non-transitory computer-readable storage medium. The memory 805 may be configured to store instructions, programs, codes, code sets, or instruction sets. The memory 805 may include a storage program area and a storage data area. The storage program area may store instructions for implementing the system, instructions for at least one function (such as touch function, sound playback function, or image playback function, etc.), and instructions for implementing the various method embodiments mentioned above, etc. The storage data area may store the data involved in the various method embodiments mentioned above. In some embodiments, the memory 805 may be at least one storage component located away from the aforementioned first processor 801. As shown in FIG. 8, the memory 805 arranged in the computer storage medium may include a first system, a network communication module, a user interface module, and a screen display program.

In the electronic device 800 shown in FIG. 8, the user interface 803 may be configured to provide an input interface for the user and obtain the data input by the user, and the first system 801 may be configured to call the screen display program stored in the memory 805 and perform the following operations:

during the operation of the first system, controlling, by the first system, the display screen to enter an always on display (AOD) mode, in a case where a first AOD condition is met in the electronic device; and transmitting, by the first system, an AOD switching instruction to the second system, in a case where a second AOD condition is met in the electronic device; wherein the AOD switching instruction is configured to indicate the second system to control the display screen to enter the AOD mode.

In some embodiments, the second AOD condition is met in the electronic device, includes: obtaining, by the first system, current operation data of the electronic device, and determining that the second AOD condition is met in the electronic device based on the current operation data.

In some embodiments, the determining that the second AOD condition is met in the electronic device based on the current operation data, includes: obtaining a service currently processed by the first system based on the current operation data, and determining that the second AOD condition is met in the electronic device in a case where the service currently processed by the first system does not include a preset service.

In some embodiments, the controlling, by the first system, a display screen to enter an AOD mode, in a case where the a first AOD condition is met in the electronic device, includes: determining that the first AOD condition is met in the electronic device based on AOD configuration parameters, in a case where the first system receives a screen-off instruction; determining first AOD information based on the AOD configuration parameters, and controlling the first AOD information to be refreshed on the display screen every a first preset time interval.

In some embodiments, the determining that the first AOD condition is met in the electronic device based on AOD configuration parameters, includes: determining that the first AOD condition is met in the electronic device, in a case where that an AOD function is enabled and a current time is within a duration in which the AOD is enabled is determined based on the AOD configuration parameters.

In some embodiments, in a case where the second AOD condition is met in the electronic device, the method further includes: transmitting, by the first system, the first AOD information to the second system, such that the second system determines second AOD information based on the first AOD information.

In some embodiments, the AOD switching instruction being configured to indicate the second system control display screen to enter the AOD mode includes: the AOD switching instruction being configured to indicate the second system to control the display screen to display the second AOD information.

In some embodiments, the second system controls the second AOD information to be refreshed on the display screen every a second preset time interval.

In some embodiments, the second AOD information is determined based on the first AOD information, and an initial display position of the second AOD information on the display screen is different from a final display position of the first AOD information on the display screen.

In some embodiments, after the second system controls the display screen to enter the AOD mode, the second system controls the display screen to exit the AOD mode in a case where a third AOD condition is not met in the electronic device.

In some embodiments, the first system enters a sleep state after the first system transmits the AOD switching instruction to the second system.

In some embodiments, after the first system enters the sleep state, the method further includes: exiting, by the first system, the sleep state in a case where the first system receives interrupt information, and transmitting an AOD exited instruction to the second system; the AOD exited instruction is configured to indicate the second system to control the display screen to exit the AOD mode. The interrupt information includes at least one of external operation information, application notification information, and system notification information.

In some embodiments provided herein, it should be understood that the disclosed apparatuses and methods may be implemented in other ways. For example, the apparatus embodiments described above are merely illustrative. For example, the division of the above module is only a logical function division. In actual implementation, there may be another division manner. For example, multiple modules or components may be combined or integrated into another system, or some features can be ignored or not executed. In addition, the mutual coupling or direct coupling or communication connection shown or discussed may be an indirect coupling or communication connection through some interfaces, apparatus or modules, and may be electrical or in other forms.

The modules described as separate components may or may not be physically separated, and the components described as display modules may or may not be physical modules. The components may be located in one place, or may be distributed to multiple network units. Some or all of the components may be selected according to actual needs to achieve the purpose of solutions of the embodiments.

In addition, each functional module in each embodiment of the present disclosure may be integrated into one processing module, or each module may exist physically separately. Optionally, two or more modules may be integrated into one module. The above integrated modules can be implemented in the form of hardware or in the form of a software functional module.

The above-described integrated modules may be stored in a computer-readable memory if the integrated modules are implemented in the form of software functional modules and sold or used as a standalone product. Based on such understanding, the technical solution of the present disclosure, in essence or the contribution to the prior art, or all or part of the technical solution may be embodied in the form of a software product. The software product may be stored in a storage medium. The software product may include a number of instructions causing a computer device (the computer device may be a personal computer, a server or a network device, and the like) to perform all or parts of the operations of the above-described methods of various embodiments of the present disclosure. The foregoing storage medium may include a U disk, a read-only memory (ROM), a random access memory (RAM), a magnetic disk, an optical disk, and the like.

It should be noted that, for the foregoing method embodiments, for the sake of brevity, the method embodiments are all described as a combination of a series of actions. However, those skilled in the art should understand that the present disclosure is not limited by the action sequence described here. It is because that certain operations may be performed in other sequences or simultaneously. Then, those skilled in the art should also understand that the embodiments described in the specification are all optional embodiments, and the actions and modules involved are not necessarily required by the present disclosure.

In the above embodiments, the description of each embodiment has its own emphasis. For the parts that are not detailed in one embodiment, please refer to the relevant description of other embodiments.

The above is a description of a screen display method, an apparatus, a storage medium, and an electronic device provided in some embodiments of the present disclosure. For those skilled in the art, there may be changes in the specific implementation and application scope based on the ideas of the embodiments of the present disclosure. Therefore, the content of the description should not be understood as limit to the present disclosure.

What is claimed is:

1. A screen display method, performed by an electronic device, wherein the electronic device at least comprises a display screen, a first processor, and a second processor; the first processor is configured to run a first system, the second processor is configured to run a second system, and a power consumption during an operation of the second system is lower than a power consumption during an operation of the first system: the method comprises:

during the operation of the first system, controlling, by the first system, the display screen to enter an always on display (AOD) mode, in a case where a first AOD condition is met in the electronic device;

wherein the controlling, by the first system, the display screen to enter the always on display (AOD) mode, in the case where the first AOD condition is met in the electronic device, comprises:

determining that the first AOD condition is met in the electronic device based on AOD configuration parameters, in a case where the first system receives a screen-off instruction;

determining first AOD information based on the AOD configuration parameters, and controlling the first AOD information to be refreshed on the display screen every a first preset time interval.

2. The method as claimed in claim 1, wherein the determining that the first AOD condition is met in the electronic device based on AOD configuration parameters, comprises:

determining that the first AOD condition is met in the electronic device, in a case where that an AOD function is enabled and a current time is within a duration in which the AOD is enabled is determined based on the AOD configuration parameters.

3. The method as claimed in claim 1, further comprising:

transmitting, by the first system, the first AOD information to the second system, such that the second system determines second AOD information based on the first AOD information.

4. The method as claimed in claim 3, wherein the AOD switching instruction is configured to indicate the second system to control the display screen to display the second AOD information.

5. The method as claimed in claim 4, wherein the second system controls the second AOD information to be refreshed on the display screen every a second preset time interval.

6. The method as claimed in claim 5, wherein an initial display position of the second AOD information on the display screen is different from a final display position of the first AOD information on the display screen.

7. An electronic device, comprising a memory, a processor, a computer program stored in the memory and executable by the processor, and a display screen: the processor comprising a first processor and a second processor: wherein the first processor is configured to run a first system, the second processor is configured to run a second system, and a power consumption during an operation of the second system is lower than a power consumption during an operation of the first system: the processor is configured to execute the computer program to perform a method comprising:

during the operation of the first system, controlling, by the first system, the display screen to enter an always on display (AOD) mode, in a case where a first AOD condition is met in the electronic device;

wherein the controlling, by the first system, the display screen to enter the always on display (AOD) mode, in the case where the first AOD condition is met in the electronic device, comprises:

determining that the first AOD condition is met in the electronic device based on AOD configuration parameters, in a case where the first system receives a screen-off instruction;

determining first AOD information based on the AOD configuration parameters, and controlling the first AOD information to be refreshed on the display screen every a first preset time interval.

8. The method as claimed in claim 1, further comprising:

transmitting, by the first system, an AOD switching instruction to the second system, in a case where a second AOD condition is met in the electronic device;

wherein the AOD switching instruction is configured to indicate the second system to control the display screen to enter the AOD mode.

9. The method as claimed in claim 8, wherein the second AOD condition being met in the electronic device is determined based on current operation data of the electronic device.

10. The method as claimed in claim 9, wherein the second AOD condition being met in the electronic device is determined based on a service currently processed by the first system, the service currently processed by the first system excludes a preset service and is obtained based on the current operation data.

11. The method as claimed in claim 8, wherein after the second system controls the display screen to enter the AOD mode, the second system controls the display screen to exit the AOD mode in a case where a third AOD condition is not met in the electronic device.

12. The method as claimed in claim 11, wherein the third AOD condition comprises that a current time is located in a duration between a start time and an end time of the AOD mode.

13. The method as claimed in claim 11, wherein the second system directly turns off the display screen in a case where a third AOD condition is not met in the electronic device.

14. The method as claimed in claim 8, wherein the first system enters a sleep state after the first system transmits the AOD switching instruction to the second system.

15. The method as claimed in claim 14, wherein after the first system enters the sleep state, the method further comprises:

exiting, by the first system, the sleep state in a case where the first system receives interrupt information, and transmitting an AOD exited instruction to the second system: wherein the AOD exited instruction is configured to indicate the second system to control the display screen to exit the AOD mode and the first system to display the content corresponding to the interrupt information.

16. The method as claimed in claim 15, wherein the interrupt information comprises at least one of external operation information, application notification information, and system notification information.

17. The electronic device as claimed in claim 7, wherein the determining that the first AOD condition is met in the electronic device based on AOD configuration parameters, comprises:

determining that the first AOD condition is met in the electronic device, in a case where that an AOD function is enabled and a current time is within a duration in which the AOD is enabled is determined based on the AOD configuration parameters.

18. A non-transitory computer storage medium, storing a plurality of instructions, wherein the plurality of instructions are configured to be loaded by a processor and perform a method, the processor comprising a first processor and a second processor: the first processor is configured to run a first system, the second processor is configured to run a second system, and a power consumption during an operation of the second system is lower than a power consumption during an operation of the first system:

the method comprises:

during the operation of the first system, controlling, by the first system, the display screen to enter an always on display (AOD) mode, in a case where a first AOD condition is met in the electronic device;

wherein the controlling, by the first system, the display screen to enter the always on display (AOD) mode, in the case where the first AOD condition is met in the electronic device, comprises:

determining that the first AOD condition is met in the electronic device based on AOD configuration parameters, in a case where the first system receives a screen-off instruction;

determining first AOD information based on the AOD configuration parameters, and controlling the first AOD information to be refreshed on the display screen every a first preset time interval.

\* \* \* \* \*